(12) United States Patent
Narahari et al.

(10) Patent No.: US 12,250,110 B2
(45) Date of Patent: Mar. 11, 2025

(54) SUBSCRIBER FEEDBACK MECHANISM FOR REAL-TIME NETWORK SERVICE UPGRADE

(71) Applicant: AT&T Intellectual Property I, L.P., Atlanta, GA (US)

(72) Inventors: Sridhar Narahari, Milpitas, CA (US); John Gibbons, Ballston Lake, NY (US); Michael Satterlee, Clifton Park, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 18/164,763

(22) Filed: Feb. 6, 2023

(65) Prior Publication Data
US 2023/0179469 A1    Jun. 8, 2023

Related U.S. Application Data

(63) Continuation of application No. 17/495,206, filed on Oct. 6, 2021, now Pat. No. 11,595,247.

(51) Int. Cl.
*H04L 41/0659* (2022.01)
*H04L 41/0631* (2022.01)
*H04L 41/0677* (2022.01)
*H04L 43/04* (2022.01)
*H04L 43/065* (2022.01)

(52) U.S. Cl.
CPC ...... *H04L 41/0661* (2023.05); *H04L 41/0636* (2013.01); *H04L 41/0677* (2013.01); *H04L 43/04* (2013.01); *H04L 43/065* (2013.01)

(58) Field of Classification Search
CPC ............ H04L 41/0672; H04L 41/0677; H04L 43/065
See application file for complete search history.

(56) References Cited

U.S. PATENT DOCUMENTS

| | | | |
|---|---|---|---|
| 6,822,961 B1* | 11/2004 | Constantinof | H04Q 11/0478 370/395.2 |
| 8,634,431 B1* | 1/2014 | Chiang | H04L 47/621 370/395.21 |
| 10,791,026 B2* | 9/2020 | Tomkins | H04L 41/142 |
| 2002/0091722 A1* | 7/2002 | Gupta | H04L 43/00 |
| 2008/0151817 A1* | 6/2008 | Fitchett | H04W 28/20 370/329 |

(Continued)

OTHER PUBLICATIONS

Non Final Office Action received for U.S. Appl. No. 17/495,206 dated Jun. 23, 2022, 90 pages.

(Continued)

*Primary Examiner* — Philip C Lee
(74) *Attorney, Agent, or Firm* — Guntin & Gust, PLC; Atanu Das

(57) ABSTRACT

Architectures and techniques are presented that provide an improved mechanism for a subscriber entity to report to a network provider a network issue that affects the performance of an application that uses a service provided by the network provider. The improved mechanism can enable fine granularity with respect to the network issue by identifying the issue on a per-session basis. In response to feedback data that is reported by the subscriber entity, the network provider can perform self-healing or other upgrade techniques to rapidly remedy the network issue.

20 Claims, 10 Drawing Sheets

(56) References Cited

U.S. PATENT DOCUMENTS

| | | | | |
|---|---|---|---|---|
| 2008/0228772 A1* | 9/2008 | Plamondon | ......... | G06F 16/9574 |
| 2009/0172315 A1* | 7/2009 | Iyer | ....................... | G06F 12/126 |
| | | | | 711/158 |
| 2011/0310814 A1* | 12/2011 | Callard | ................ | H04W 72/52 |
| | | | | 370/329 |
| 2014/0025830 A1* | 1/2014 | Grinshpun | ............ | H04L 5/0064 |
| | | | | 709/227 |
| 2016/0154734 A1* | 6/2016 | Kim | ...................... | G06F 12/084 |
| | | | | 711/130 |
| 2016/0246652 A1* | 8/2016 | Herdrich | ................ | G06F 9/5077 |
| 2017/0317894 A1* | 11/2017 | Dao | .................... | H04L 41/5009 |
| 2017/0332282 A1* | 11/2017 | Dao | ...................... | H04L 1/0002 |
| 2018/0041913 A1* | 2/2018 | Zhu | ......................... | H04L 65/65 |
| 2018/0376384 A1* | 12/2018 | Youn | ...................... | H04W 36/14 |
| 2019/0215731 A1* | 7/2019 | Qiao | ..................... | H04W 24/06 |
| 2020/0153712 A1* | 5/2020 | Miao | .................... | H04W 72/12 |
| 2020/0280871 A1* | 9/2020 | Khirallah | .......... | H04W 28/0257 |
| 2021/0410029 A1* | 12/2021 | Farag | ................. | H04L 43/0894 |
| 2022/0086698 A1* | 3/2022 | Yao | ................... | H04W 28/0273 |

OTHER PUBLICATIONS

Non Final Office Action received for U.S. Appl. No. 17/495,206 dated Oct. 27, 2022, 120 pages.
U.S. Appl. No. 17/495,206, filed Oct. 6, 2021.

* cited by examiner

SUBSCRIBER FEEDBACK MECHANISM FOR REAL-TIME NETWORK SERVICE UPGRADE

RELATED APPLICATION

The subject patent application is a continuation of, and claims priority to, U.S. patent application Ser. No. 17/495,206, filed Oct. 6, 2021, and entitled "SUBSCRIBER FEEDBACK MECHANISM FOR REAL-TIME NETWORK SERVICE UPGRADE," the entirety of which priority application is hereby incorporated by reference herein.

TECHNICAL FIELD

The present application relates generally to a subscriber feedback mechanism for real-time network service upgrade, e.g., enabling, for subscribers to a network service, an improved ability to submit feedback regarding a network issue or poor experience and implementing, on-the-fly, an upgrade procedure to address or remedy the network issue or poor experience.

BACKGROUND

Providers of network services continually seek ways to improve the experiences of customers. Even today, it is not uncommon, in some networks, for a network provider to be unaware of a network issue (e.g., an outage, poor service, . . . ) until a customer calls in to report the issue. A recent trend in the quest to improve subscriber experiences has seen significant focus on so-called self-healing networks. Typically, a self-healing network is one that can self-detect a network issue and then, potentially automatically, seek a remedy to the network issue. Self-healing networks tend to rely extensively on machine learning techniques both to detect and remedy network issues.

BRIEF DESCRIPTION OF THE DRAWINGS

Numerous aspects, embodiments, objects and advantages of the present application will be apparent upon consideration of the following detailed description, taken in conjunction with the accompanying drawings, in which like reference characters refer to like parts throughout, and in which.

DETAILED DESCRIPTION

Overview

Figure 1:
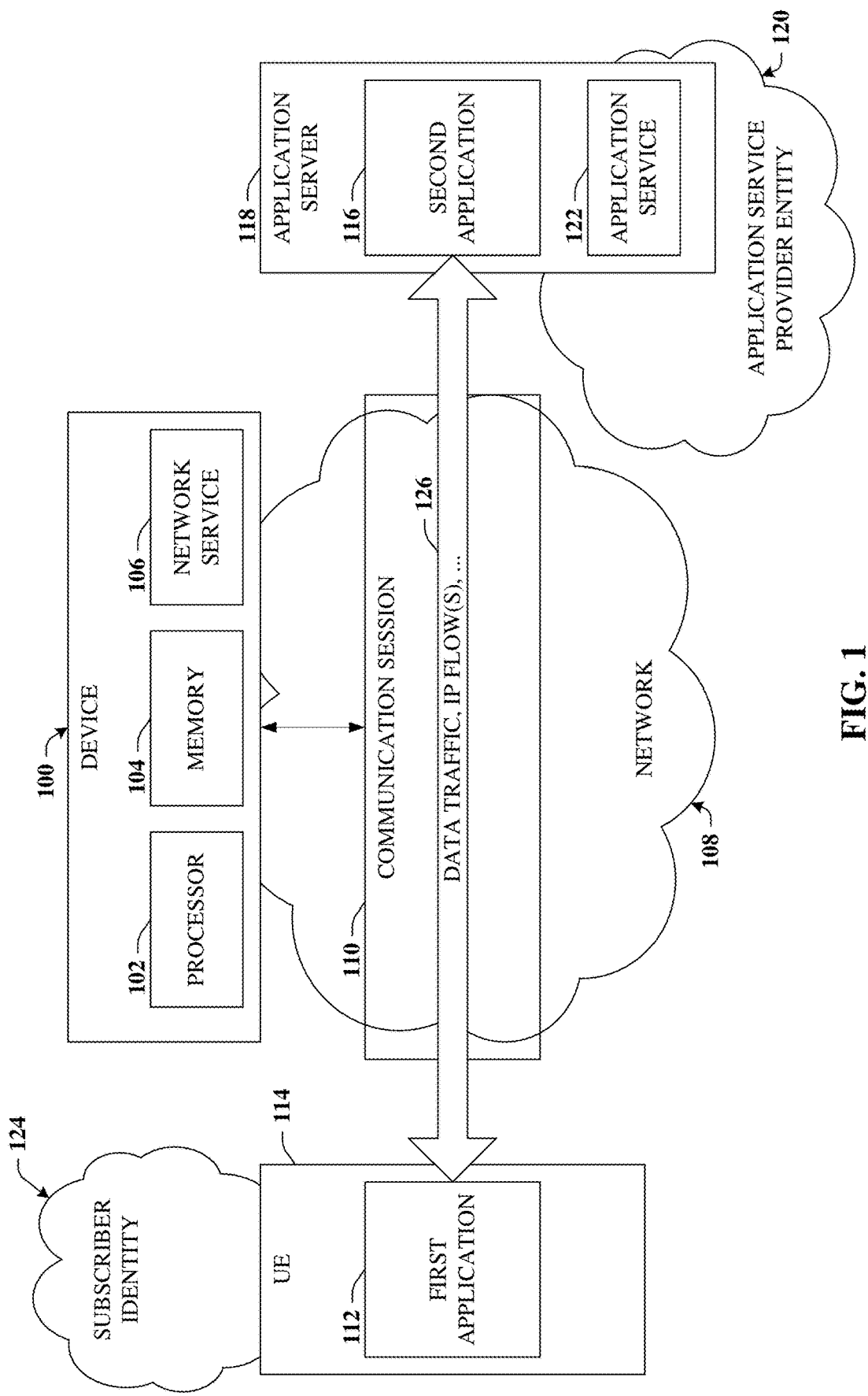
FIG. 1 depicts a block diagram of an example network architecture in accordance with certain embodiments of this disclosure.

As detailed in the Background section, there are essentially two distinct approaches to resolving network issues that affect a subscriber's experiences. Historically, when a subscriber experiences poor service, in order to seek a remedy, the subscriber typically called the network provider. In many cases, the network provider was not even aware of the issue until the phone call and thereafter, service personnel are allocated to identify and remedy the issue. This customer call approach, in which the network provider relies on a customer phone call to alert of a network issue, is often extremely inefficient, costly, time-consuming, and can lead to subscriber dissatisfaction.

In an effort to avoid these many negative consequences, modern network providers have increasingly turned to a newer approach referred to herein as the self-healing approach (as distinct from the customer call approach noted above) in which the network devices can automatically detect the existence of network issues (as opposed to being alerted by the subscriber) and automatically remedy the network issues.

It is readily apparent that the self-healing approach has significant advantages over the customer call approach. Indeed, it is expected that innovation in the coming years will further improve the efficiency of self-healing networks. However, because network issue detection is typically performed by machines through learning techniques, the ability of a self-healing network to detect a network issue will tend to be based on a probability distribution, and therefore it might not be conceivable to expect self-healing networks to ever evolve to detecting 100% of network issues.

Hence, while the self-healing approach does have numerous advantages over the customer call approach, the customer call approach does have the advantage of being capable of identifying some network issues that are not detected by the self-healing approach. Moreover, with the increasing popularity in what is referred to herein as "critical application", meaning applications that have extremely low tolerance for network issues (e.g., remote surgery, driverless cars or other unmanned vehicles, . . . ) it is clear that network providers will face many challenges with the prospect of self-healing networks that may not be capable of detecting all network issues. For example, network providers that provide service to critical applications (or even ordinary applications) must consider the potential of the self-healing network to be unable to detect a potential network issue and therefore being unable to remedy that issue.

The disclosed subject matter, in some embodiments, can be considered a hybrid of the two approaches noted above, in which certain advantages of both approaches are maintained, while certain disadvantages are avoided. For example, a significant disadvantage of the customer call approach is the mechanism (e.g., a phone call to network provider customer service number) to alert the network provider of the issue is slow, inefficient, and inconvenient. However, a potential advantage of this approach is the capability to identify a network issue that may go undetected by self-healing approaches.

The disclosed subject matter, in some embodiments, can provide an improved mechanism for reporting a network issue. For example, a mechanism that makes the reporting rapid, efficient, and convenient from the subscriber's perspective. In some cases, the reporting can be completely automated, requiring no effort at all by the subscriber. For example, the disclosed subject matter can support extremely simple, convenient, and rapid real-time feedback that can be correlated within the network to a specific IP flow or a set of IP flows. Thus apprised that a specific IP flow is experiencing an issue, action can be taken to address the issue.

While distinct from previous self-healing approaches that exclusively rely on self-detection, the disclosed techniques can incorporate many or all techniques used by self-healing approaches. For example, the disclosed techniques can rely on both self-detection and the improved reporting mechanism in order to detect a network issue, and thereafter rely on self-healing techniques (or other suitable techniques) to remedy the network issue. In other words, the disclosed techniques can operate alongside, and benefit from, current self-healing techniques and subsequent advances. By providing an improved mechanism to report network issues, rather than relying exclusively on self-detection, the disclosed subject matter can represent a welcome advance to network service providers whether or not they pursue self-healing techniques for their network services.

The disclosed subject matter can have significant benefits for networks that implement self-healing techniques due to the ability to detect network issues that are not detected by self-healing techniques. These can include issues that a self-healing network simply failed to detect as well as issues a self-healing network is not designed to detect such as a level of connection that does not match subscriber expectations. The disclosed subject matter can provide users and applications (e.g., those that are critical or premium in nature) a way to give direct feedback to the network using popular interfaces such as voice, text, or an application programming interface (API) and immediately improve the quality of the underlying service based on that feedback. In addition, such feedback can be easy and intuitive to use and yield rapid results versus historical customer call approaches. Such can even lead to new forms of subscriptions such as a higher level of service upon request type of subscription and to new application development for critical (or other) applications that can implement appropriate APIs and user interfaces to facilitate initial registration and reporting issues in a simplified manner or even doing so automatically without user intervention. Examples of the disclosed techniques are hereinafter primarily provided in the context of a mobile network, but it is appreciated that the disclosed techniques can be implemented in any type of network.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to FIG. 1, an example network architecture is depicted in accordance with certain embodiments of this disclosure. For example, device 100 can be a network device of a network provider that provides a network service 106. For instance, device 100 can facilitate the service of communication, via network 108, between two or more other devices. Device 100 can comprise a processor 102 that can be specifically configured to provide network service 106 or another service such as a session upgrade service detailed, infra. Device 100 can also comprise memory 104 that stores executable instructions that, when executed by processor 102, can facilitate performance of operations. Processor 102 can be a hardware processor having structural elements known to exist in connection with processing units or circuits, with various operations of processor 102 being represented by functional elements shown in the drawings herein that can require special-purpose instructions, for example stored in memory 104 and/or record procedure 106 component or circuit. Along with these special-purpose instructions, processor 102 and/or device 100 can be a special-purpose device. Further examples of the memory 104 and processor 102 can be found with reference to FIG. 10. It is to be appreciated that device 100 or computer 1002 can represent a server device of a communications network or a user equipment device and can be used in connection with implementing one or more of the systems, devices, or components shown and described in connection with FIG. 1 and other figures disclosed herein.

As noted, device 100 can provide network service 106 such as, for example, use of network 108 by one or more subscribers. Further, device 100 can manage traffic associated with network service 106. In response to managing traffic, device 100 can establish communication session 110 between first application 112 executing on user equipment (UE) 114 and second application 116 executing on application server 118. Typically, UE 114 can be associated with a subscriber identity (e.g., a subscriber to network service 106) and application server 118 can be associated with an application service provider entity 120 that provides an application service to first application 112. By way of example, first application 112 can be a video streaming application, a gaming application, or any other application that relies on network service 106 and/or utilizes network 108 to communicate with application server 118. It is further appreciated that application service provider entity 120 can also represent a subscriber identity 124.

Once communication session 110 is established between UE 114 and application server 118, first application 112 and second application 116 can communicate via packet-based IP flows 126. Many network parameters, some of them run-time parameters that are not ordinarily configurable but rather automatically set based on a current network or device state, are used to construct communication session 110 and to handle IP flows 126. In most cases, these parameters are set in a manner that provides satisfactory service. However, in some cases a network issue can arise, which can result from the set values of said parameters or due to some other cause. It is the latter case that is generally assumed with the remainder of this document. Namely, that a subscriber (e.g., subscriber identity 124) experience is not what is expected, that a quality of service indicator is below a defined threshold, or any suitable network issue that degrades performance of first application 112 or second application 116. Often, these issues are embodied as latency or 'lag' being above a certain threshold, throughput being below a certain threshold or another quality of service indicator being outside acceptable or expected ranges.

Figure 2:
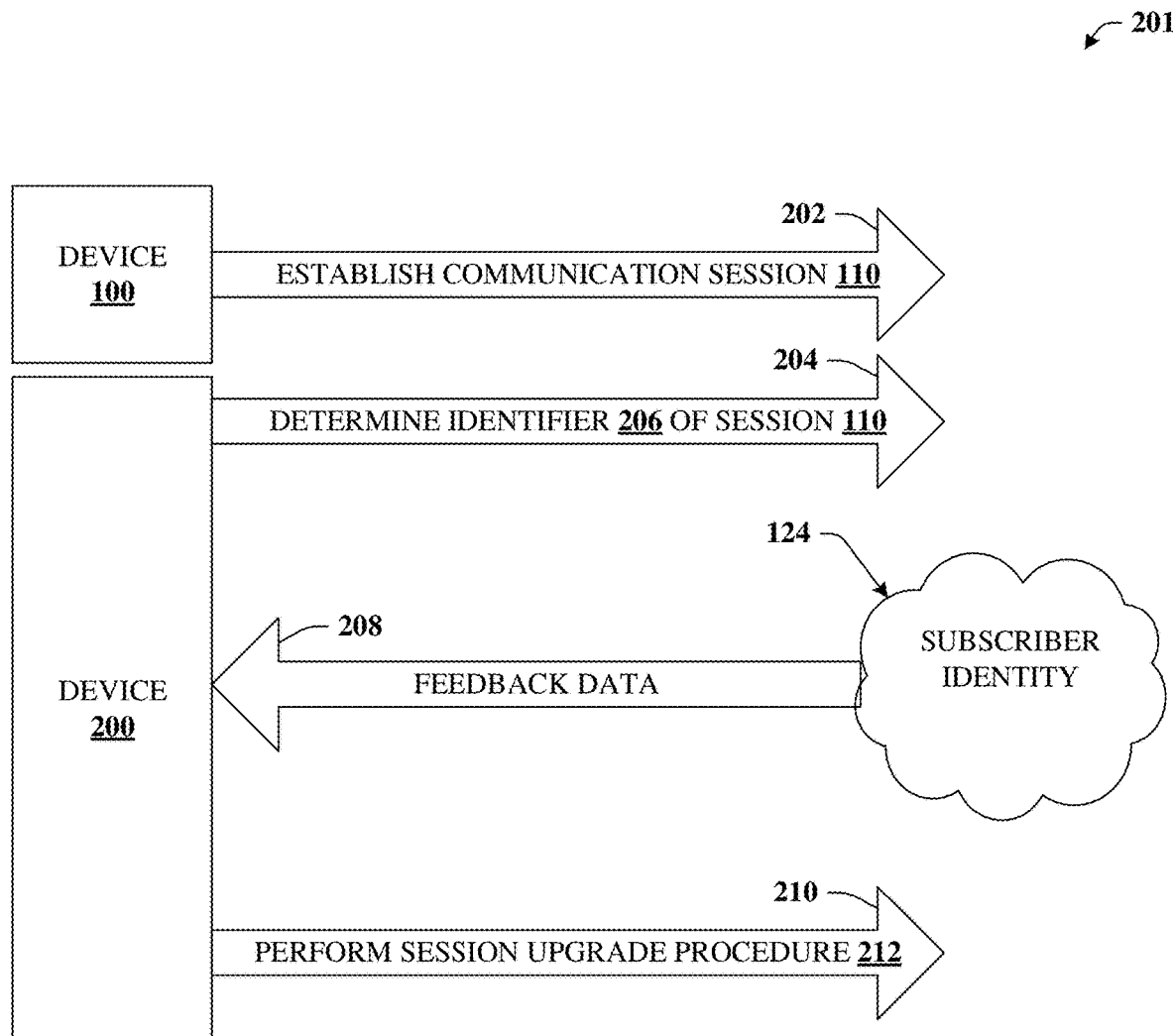
FIG. 2 shows a schematic block diagram illustrating an improved reporting mechanism for a network service issue in accordance with certain embodiments of this disclosure.

Turning now to FIG. 2, a schematic diagram 201 is depicted. Diagram 201 illustrates an improved reporting mechanism for a network service issue in accordance with certain embodiments of this disclosure. In the illustrated embodiment, device 100 can establish communication session 110, as detailed in connection with FIG. 1 and illustrated here at reference numeral 202. Diagram 201 further includes device 200, which is illustrated here as being distinct from device 100, but it is understood that device 200 can include all or a portion of the structure or function of device 100 in some embodiments. In other embodiments, device 200 can be different than device 100, which, inter alia, provides service 106, manages network traffic and establishes connection session 110, and instead focus exclusively on the elements detailed hereinafter.

Hence, regardless of which device (e.g., device 100) is implemented to provide service 106 and establish communication session 110, device 200 can, as illustrated at reference numeral 204, determine an identifier 206 of communication session 110. In other words, the specific communication session 110 that is established between UE 114 and application server 118, by which all traffic and IP flows 126 are exchanged can be uniquely identified by identifier 206.

It is appreciated that a single subscriber identity 124 can possibly access network service 106 via many different UE devices 114 and each UE device 114 can potentially execute many different applications (e.g., first application 112) and each of those applications can conceivably leverage network service 106 to communicate with application server 118 or other, different application servers or endpoints, which is further detailed in connection with FIG. 4. Hence, it can be useful for a network provider to keep track of and/or be capable of distinguishing individual communication sessions 110 and/or specific IP flows 126 or specific groups of IP flows 126, even between communication sessions 110 having identical endpoints. Identifier 206 represents one example way of maintaining such information that can uniquely identify a specific communication session 110 or associated IP flow(s) 126. Moreover, because the disclosed subject matter has the ability to remedy network issues on a per-session basis, this per-session granularity has increased significance.

Now suppose a potential network issue is identified, either by a user associated with subscriber identity 124 or by first application 112. It is appreciated that such a potential network issue can be due to the network service 106 performing below a quality of service threshold but can also be simply due to performance that is not meeting an expectation of the user or first application 112, regardless of a contractually agreed level of service.

In response, feedback data 208 can be provided by subscriber identity 124, indicating that a quality of service of communication session 110 (or associated IP flow(s) 126) is below a defined threshold. It is appreciated that feedback data 208 need not originate from UE device 114 or from first application 112, but rather can come from any suitable device or application, provided the network has the ability to identify the specified communication session 110 and/or associated IP flow(s) 126 where the issue is observed. While strict mapping or tracking of identifier 206 can represent one potential mechanism for ascertaining the specific communication session 110 where an issue is observed, other mechanisms can exist such as device or application registration, which can be useful for critical applications or other techniques, which are further detailed in connection with FIG. 5.

In response to receiving feedback data 208, device 200, as illustrated at reference numeral 210, can perform session upgrade procedure 212. Session upgrade procedure 212 can be configured to increase the quality of service of communication session 110 according to a defined criterion. It is appreciated that session upgrade procedure 212 can be initiated on a per-session basis and can be deployed to immediately remedy the underlying network issue.

The nature or form of session upgrade procedure 212 can vary dramatically based on the nature of the issue, a type of network 108, a type of UE device 114, a type of first application 112, or other suitable factors. In some embodiments, session upgrade procedure 212 can leverage self-healing techniques by responding to feedback data 208 in a similar manner, with a distinction being that said response is to direct endpoint reporting rather than from self-detection. Some examples of session upgrade procedure 212 are set forth in connection with FIG. 3.

Figure 3:
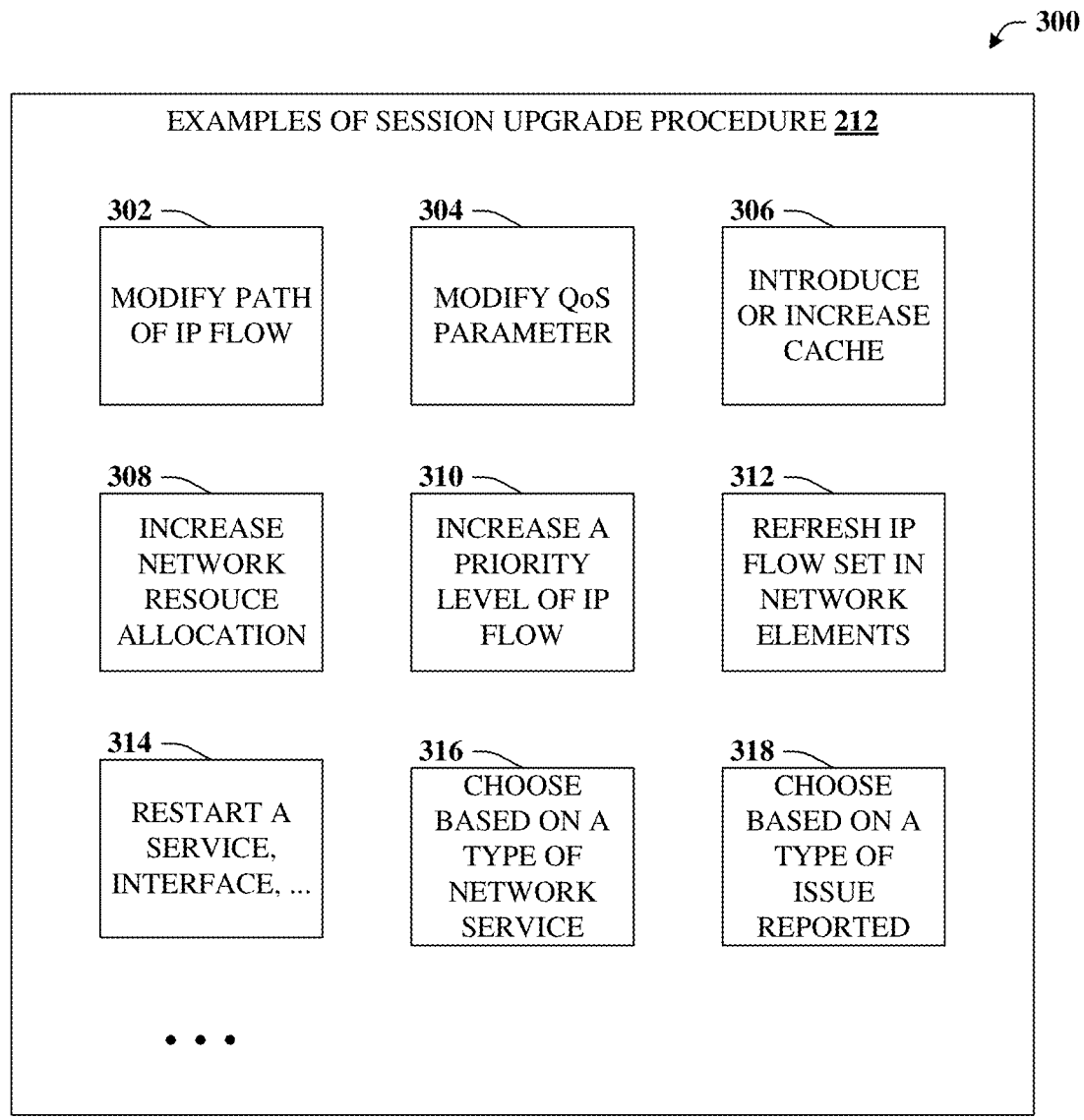
FIG. 3 illustrates a schematic block diagram illustrating various examples of the session upgrade procedure in accordance with certain embodiments of this disclosure.

Referring now to FIG. 3, a schematic diagram 300 is depicted. Diagram 300 illustrates various examples of session upgrade procedure 212 in accordance with certain embodiments of this disclosure. For example, at reference numeral 302, session upgrade procedure 212 can comprise modifying a network path of IP flow 126 associated with communication session 110. At reference numeral 304, session upgrade procedure 212 can comprise modifying a quality of service parameter associated with communication session 110.

At reference numeral 306, session upgrade procedure 212 can comprise introducing, or increasing a size of, a cache for communication session 110 and/or a network device associated with communication session 110 or associated IP flow(s) 126. At reference numeral 308, session upgrade procedure 212 introducing or increasing allocation of another network resource for a network device that facilitates communication session 110 or associated IP flow(s) 126. At reference numeral 310, session upgrade procedure 212 can comprise increasing a priority level of IP flow(s) 126 associated with communication session 110. At reference numeral 312, session upgrade procedure 212 can comprise refreshing IP flow(s) 126 sets in network devices. At reference numeral 314, session upgrade procedure 212 can comprise restarting a service, restarting an interface, or restarting another network element.

While the above examples represent a wide range of potential remedy procedures (e.g., session upgrade procedure 212) to various network issues, it is appreciated that other remedies can be implemented beyond the listed examples. Furthermore, the choice of remedy or an order or priority of remedies can be intelligently selected. For example, as illustrated in connection with reference numeral 316, a given remedy or session upgrade procedure 212 (e.g., one or more of 302-314) can be selected or prioritized based on a type of network 108 or a type of network service 106 being provided. For example, session upgrade procedure 212 can implement different strategies when the underlying network 108 is, e.g., a mobile network versus, e.g., a broadband network. In some embodiments, as illustrated in connection with reference numeral 318, a given remedy or session upgrade procedure 212 can be selected or prioritized based on a type of issued being reported, e.g., via feedback data 208.

Figure 4:
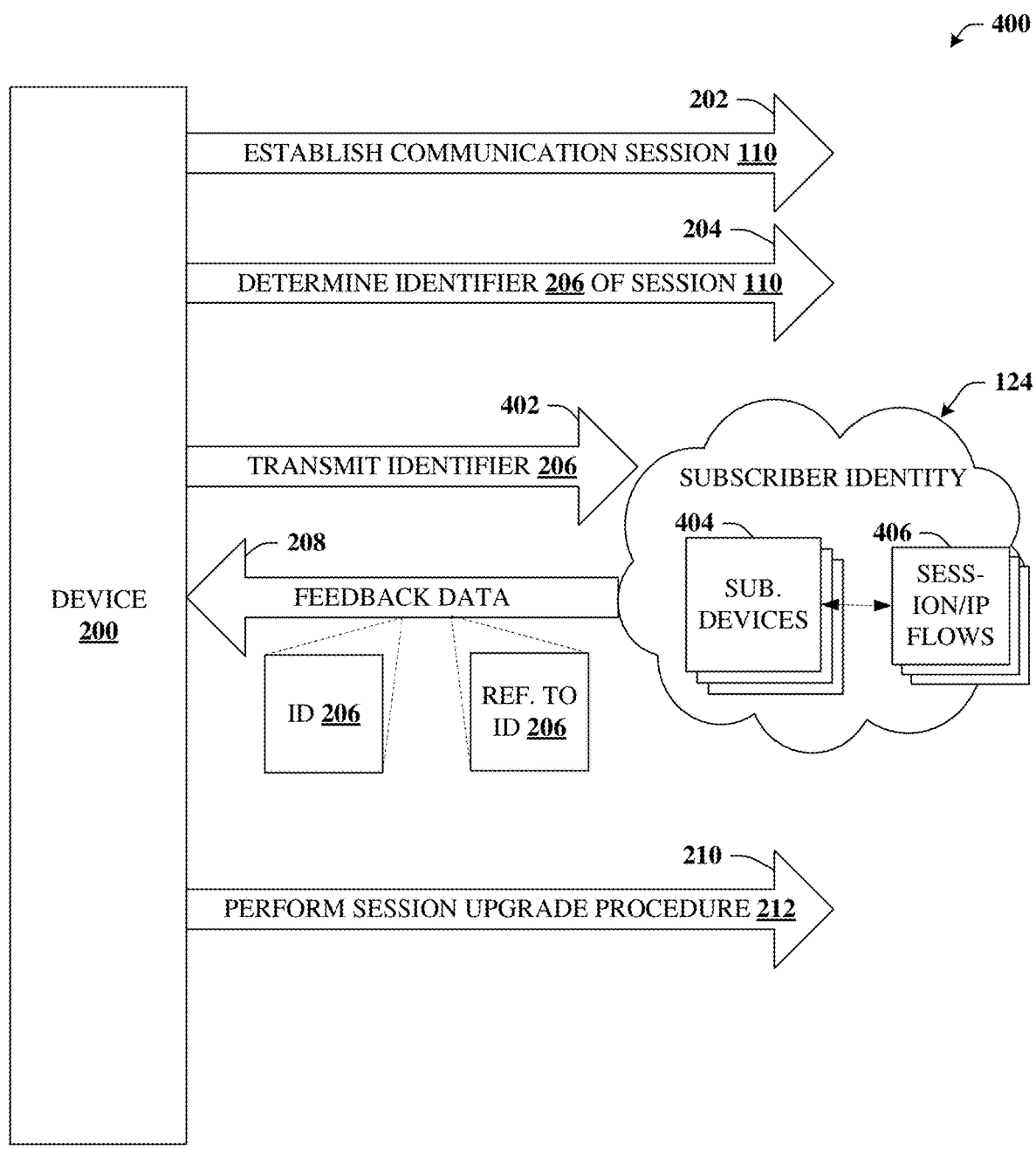
FIG. 4 illustrates a schematic block diagram illustrating various example techniques for receiving the feedback data in accordance with certain embodiments of this disclosure.

Referring now to FIG. 4, a schematic diagram 400 is depicted. Diagram 400 illustrates various example techniques for receiving feedback data 208 in accordance with certain embodiments of this disclosure. In this example, device 200 or another suitable device (e.g., device 100 of FIG. 1) can establish communication session 110 as detailed previously. Likewise, device 200 can determine identifier 206 of communication session 110, where identifier 206 represents a unique identifier of communication session 110, also previously detailed.

In some embodiments, device 200 (or another suitable device) can transmit, via transmission 402, identifier 206 to a remote entity such as subscriber identity 124. One likely target of transmission 402 can be UE 114 and/or first application 112. However, as was previously noted, the source of feedback data 208 is not limited to UE 114 or first application 112. Rather, feedback data 208 can come from any suitable source, which can be substantially any device or application associated with subscriber identity 124.

Recall, feedback data 208 indicates to device 200 that a quality of service of communication session 110 is below a defined threshold. In order to remedy the network issue on a per-session basis, device 200 relies on identifying the correct communication session 110, noting that there may be numerous communication sessions 406 opened for UE 214 (or even first application 112) and many more when considering that many subscriber devices 404 may be associated with a particular subscriber identity, each of those with their own set of communication sessions 406.

In order to aid in identifying the correct communication session 110, identifier 206 can be provided to one or more subscriber devices 404 (or applications executing thereon). In turn, identifier 206 can be included in feedback data 208, which uniquely identifies the correct communication session 110 and/or associated IP flow(s) 126 experiencing the issue. In some embodiments, feedback data 208 can, additionally or alternatively, include a reference to identifier 206. For example, the reference can be a description of the correct communication session 110 such as "my video game is lagging" or "the kid's tablet is streaming slowly". Such feedback data 208 can be provided to device 200 via any suitable device or application, such as from a voice recognition application or device, a text message, an API, and so forth.

Hence, while it is appreciated that first application 112 or second application 116 can be the source of feedback data 208, there are many embodiments envisioned in which any suitable device or application can send feedback data 208, provided device 200 has a mechanism to identify the correct connection session 110 that is experiencing the issue. For example, it is envisioned that some devices or applications can be designed to expressly track and manage relevant information, and receive identifier 206 for each connection session 110 at that location or endpoint. Using native voice recognition services, the voice recognition device can help identify the correct connection session 110 in response to a subscriber merely saying "my video game is lagging".

Additionally or alternatively, device 200 (or another suitable device) can perform the same function provided that information is delivered along with feedback data 208. As is readily apparent, first application 112 or second application 116 can generate feedback data 208 as well, in which case feedback data 208 can inherently reflect identifier 206, some reference to the correct communication session 110, or some other sufficient information (e.g., sessions or IP flow(s) associated with self). In some embodiments, a subscriber device 404 can poll first application 112 or, by proxy, UE 114 in order to obtain sufficient information. Regardless, as can be seen, such techniques can be extremely convenient, simple, and expeditious to use in order to report feedback data 402, even to the point of requiring no effort at all on the part of the subscriber such as in the case in which first application 112 (or second application 116) automatically reports the issue. The techniques detailed above can further leverage a registration procedure to aid device 200 in identifying the correct communication session 110, which is further detailed in connection with FIG. 5.

Figure 5:
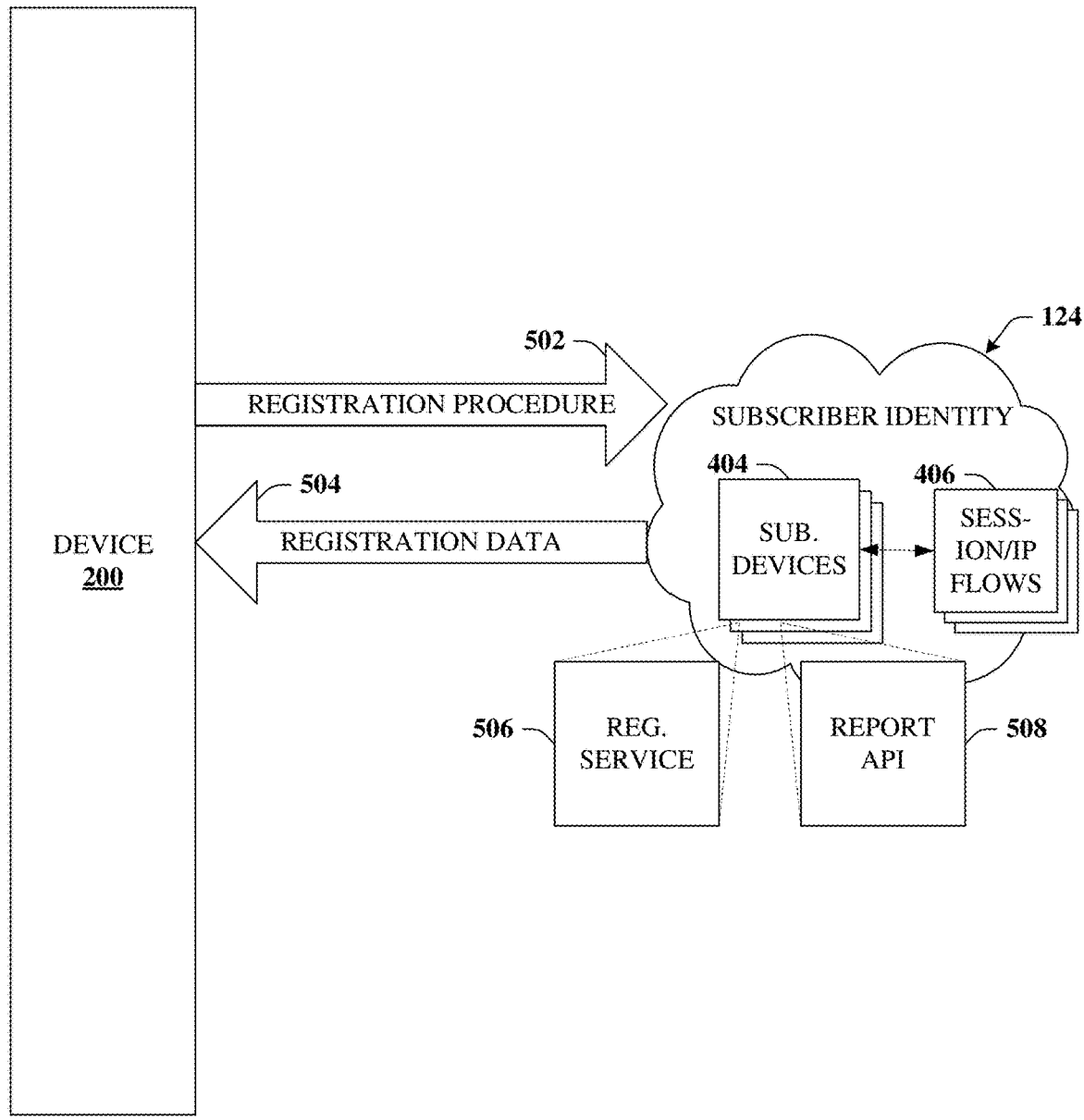
FIG. 5 shows a schematic block diagram illustrating a registration procedure in accordance with certain embodiments of this disclosure.

Turning now as well to FIG. 5, a schematic diagram of system 500 is depicted. Diagram 500 illustrates a registration procedure 502 in accordance with certain embodiments of this disclosure. The registration procedure 502 can provide for various applications (e.g., first application 112, second application 116, . . . ) or even associated subscriber devices 404 (e.g., including UE 114, application server 118, . . . ) can register or pre-register with device 200, which can facilitate further improved techniques for identifying the correct communication session 110. In addition to providing device 200 with registration data 504 in advance of any potential issue, registration procedure 502 can further validate that the registering application or device is capable of providing various services (e.g., registration service 506) such as, for instance, the ability to properly communicate with device 200 with regard to identifying the correct communication session 110; the ability to self-detect potential issues and/or the ability to self-report feedback data 208; how to handle receipt of identifier 206 in embodiments where such is provided, how to correlate certain input (e.g., voice input) to a specific device and/or application and match that specific device and/or application to the associated identifier 206 in embodiments where such is used, and so forth.

In some embodiments, the subscriber device 404 can include report API 508 and/or an associate user interface that can further aid a user in reporting issues. For example, if an issue is self-detected, the application can surface a user interface element that indicates that, e.g., throughput seems a bit low for this application and can further query whether to report it to the service provider in order to get an upgrade for the current communication session. It is appreciated that the capability of getting the upgrade (e.g., initiation of session upgrade procedure 212) can be a part of network service 106 or a different service that can be subscribed to and that can operate on the granularity of a per-session basis rather than a per-subscriber identity 124 basis. Moreover, results of session upgrade procedure 212 can be virtually instantaneous, unlike previous methods of calling the service provider or otherwise interacting with a customer service entity.

Example Methods

Figure 6:
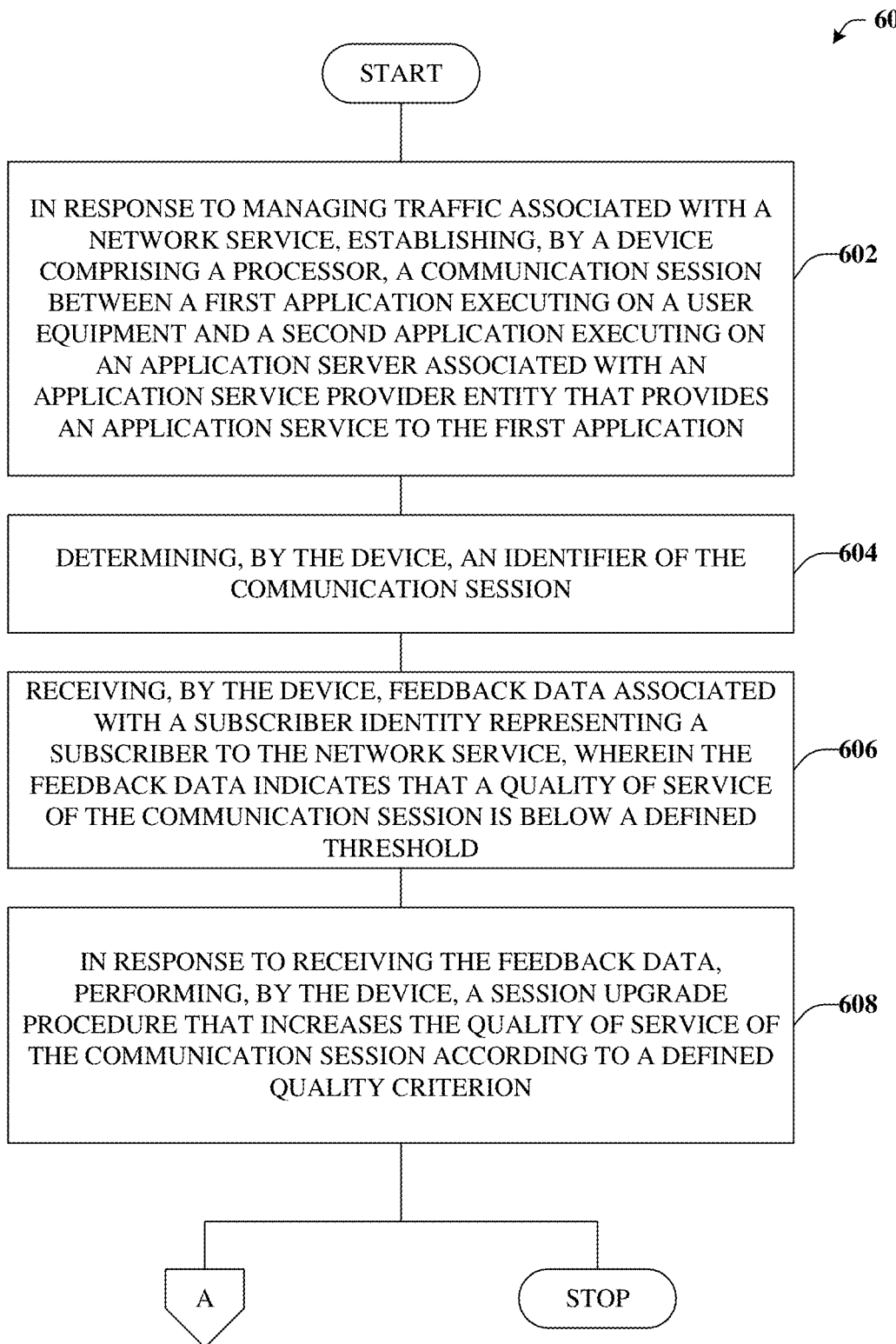
FIG. 6 illustrates an example method that can provide an improved reporting mechanism for a network service issue in accordance with certain embodiments of this disclosure.
Figure 7:
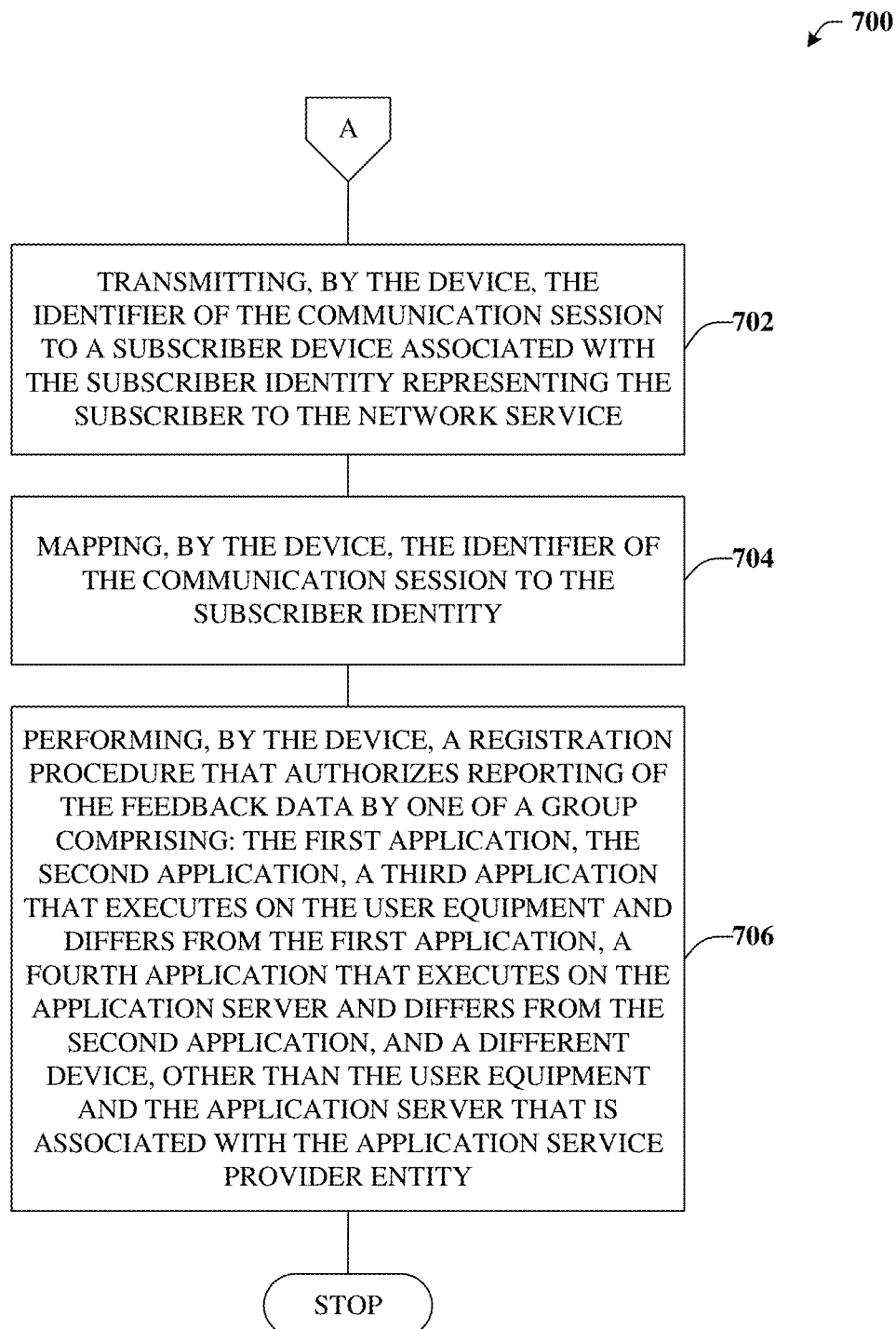
FIG. 7 illustrates an example method that can provide for additional elements or aspects in connection with the improved reporting mechanism for a network service issue in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can provide an improved reporting mechanism for a network service issue in accordance with certain embodiments of this disclosure. For example, at reference numeral 602, a device comprising a processor can, in response to managing traffic associated with a network service, establish a communication session. The communication session can be established between a first application executing on a user equipment and a second application executing on an application server associated with an application service provider entity that provides an application service to the first application.

At reference numeral 604, the device can determine an identifier of the communication session and/or associated IP flow(s). The identifier can be a unique identifier capable of distinguishing that particular communication session and/or associated IP flow(s) from others, even when sharing a common network endpoint such as other communication session associated established with the same subscriber identity, other communication sessions established with other devices or applications at the same location, or even communication sessions established by the same device.

At reference numeral 606, the device can receive feedback data. This feedback data can be associated with a subscriber identity representing a subscriber to the network service. The feedback data can indicate that a quality of service of the communication session is below a defined threshold. The defined threshold can characterize a contractual quality of service metric guarantee or even more broadly an expectation of a given quality of service metric.

At reference numeral 608, in response to receiving the feedback data, the device can perform a session upgrade procedure. The session upgrade procedure can increase the quality of service of the communication session according to a defined quality criterion. The particular action taken by the session upgrade procedure can vary depending on many factors such as the type of underlying network, the type of issue being reported, the type of application being executed, and so forth. Method 600 can stop or proceed to insert A, which is further detailed in connection with FIG. 7.

With reference now to FIG. 7, exemplary method 700 is illustrated. Method 700 can provide for additional elements or aspects in connection with the improved reporting mechanism for a network service issue in accordance with certain embodiments of this disclosure. For example, at reference numeral 702, the device can transmit the identifier of the communication session to a subscriber device associated with the subscriber identity representing the subscriber to the network service. It is appreciated that the subscriber device can be the same or differ from the user equipment that executes first application. Receipt of the identifier can, in effect, enable correlating the communication session that is experiencing the issue at the client side, which can be subsequently included in the feedback data that reports the issue. Likewise the subscriber device that reports feedback data can be the same or differ from the user equipment that executes first application.

At reference numeral 704, the device can map the identifier of the communication session to the subscriber identity. Such can facilitate improved coordination and expand the group of devices that can be the source feedback data. For example, while using a gaming device that is experience a network issue, the subscriber can interact with a second device (e.g., a voice recognition device, mobile device) to input that the gaming device is experiencing issues in a simplified manner.

At reference numeral 706, the device can perform a registration procedure. The registration procedure can authorize reporting of the feedback data by one of a group comprising: the first application, the second application, a third application that executes on the user equipment and differs from the first application, a fourth application that executes on the application server and differs from the second application, and a different device, other than the user equipment and the application server that is associated with the application service provider entity.

Example Operating Environments

Figure 8:
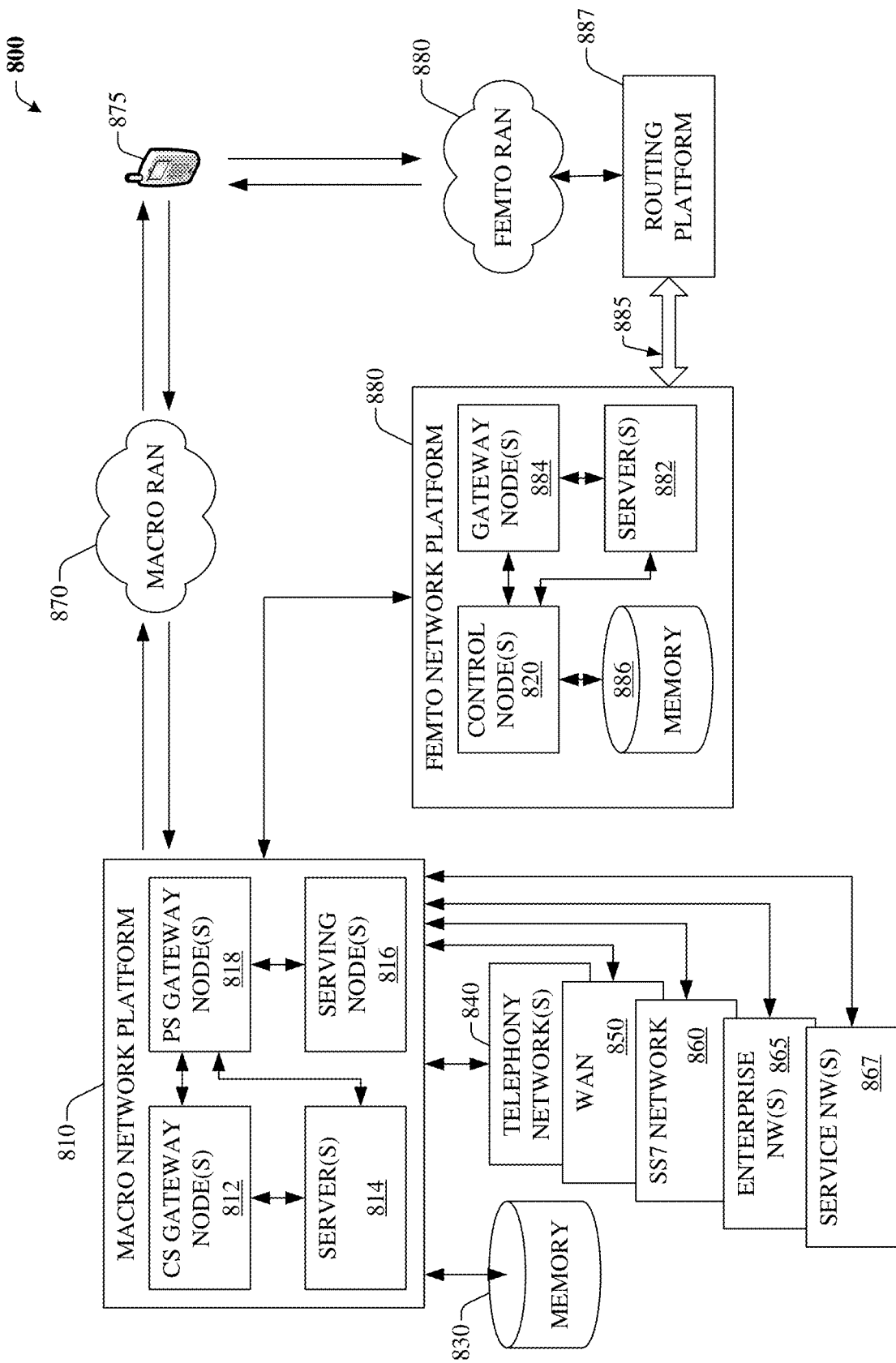
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with, user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
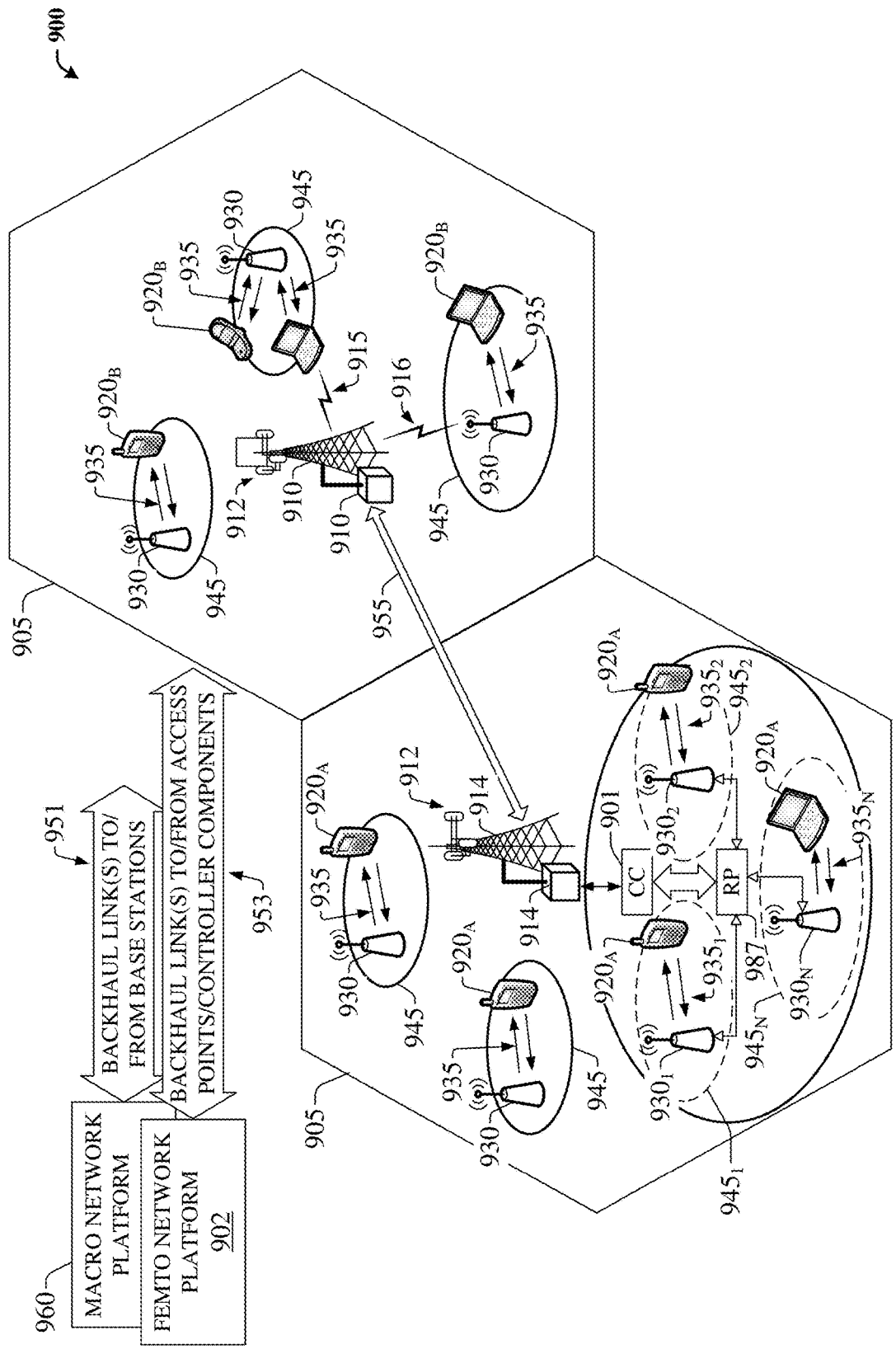
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., LoS or non-LoS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920$_A$ can be routed by the RP 987, for example, internally, to another UE 920$_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points 930$_1$-930$_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE 920$_A$ connected to femto APs 930$_1$-930$_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas 912$_1$-912$_N$. It should be appreciated that while antennas 912$_1$-912$_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
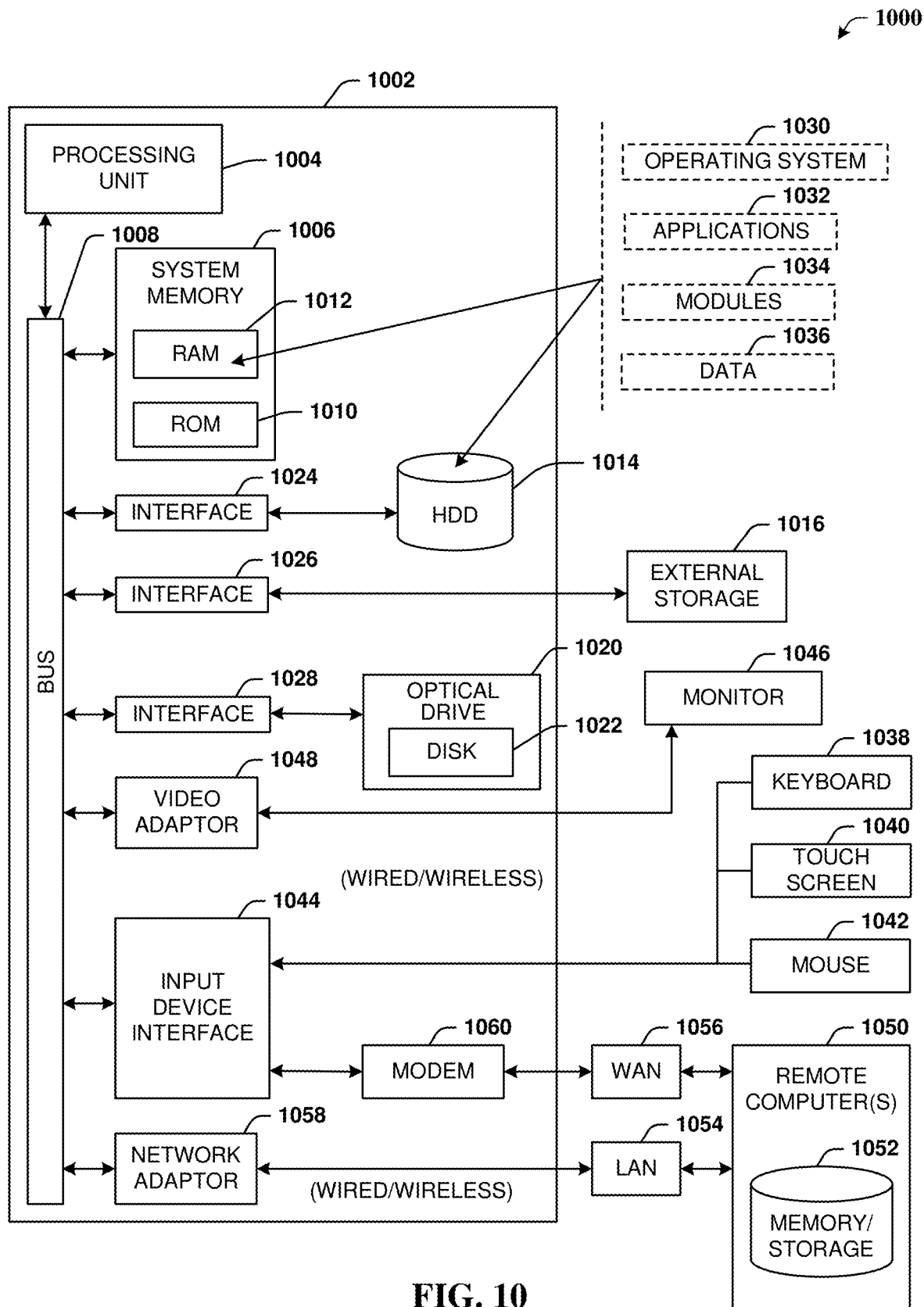
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a processor; and
a memory that stores executable instructions that, when executed by the processor, facilitate performance of operations, the operations comprising:
determining a first order of a first group of session upgrade procedures based on a first type of network providing a communication session and determining a second order of a second group of session upgrade procedures based on a second type of network providing the communication session;
in response to provisioning a network service for a subscriber identity representing a subscriber to the network service, establishing the communication session that communicates traffic flows for a device associated with the subscriber identity;
determining a session identifier that identifies the traffic flows of the communication session;
mapping the session identifier to the subscriber identity;
receiving feedback data that indicates that a quality of service of the communication session is below a defined threshold;
determining that the feedback data is associated with the subscriber identity;
determining that the communication session is provided by the first type of network resulting in a first determination;
identifying a first session upgrade procedure from the first group of session upgrade procedures based on the feedback data and the first determination, wherein the first session upgrade procedure comprises increasing a size of a cache associated with the communication session; and
based on the feedback data, performing the first session upgrade procedure, including the increasing of the size of the cache associated with the communication session, that increases the quality of service of the communication session according to a defined quality criterion.

2. The device of claim 1, wherein the operations further comprise determining that the feedback data is received from the device associated with the subscriber identity.

3. The device of claim 1, wherein the device is a first device, wherein operations further comprise determining that the feedback data was received from a second device associated with the subscriber identity, and wherein the second device differs from the first device.

4. The device of claim 1, wherein the operations comprise, based on the feedback data, performing a second session upgrade procedure from the first group of session upgrade procedures, wherein the second session upgrade procedure comprises modifying a network path of an internet protocol data flow associated with the communication session.

5. The device of claim 1, wherein the operations comprise, based on the feedback data, performing a third session upgrade procedure from the first group of session upgrade procedures, wherein the third session upgrade procedure comprises modifying a quality of service parameter associated with the communication session.

6. The device of claim 1, wherein the first session upgrade procedure comprises introducing a cache to be used for the communication session.

7. The device of claim 1, wherein the first session upgrade procedure is selected based on a type of issue reported by the feedback data.

8. The device of claim 1, wherein the operations further comprise transmitting, according to the network service, the session identifier to a subscriber device associated with the subscriber identity.

9. The device of claim 8, wherein the feedback data comprises the session identifier.

10. The device of claim 1, wherein the operations further comprise performing a registration procedure that authorizes reporting of the feedback data by one of a group comprising: a first device associated with the subscriber identity, a first application associated with the subscriber identity, a second device associated with a second subscriber identity that is a party to the communication session, or a second application associated with the second subscriber identity.

11. The device of claim 10, wherein determining the session identifier is in response to the registration procedure.

12. A non-transitory machine-readable medium, comprising executable instructions that, when executed by a processor, facilitate performance of operations, comprising:

determining a first order of a first group of session upgrade procedures based on a first type of network providing a communication session and determining a second order of a second group of session upgrade procedures based on a second type of network providing the communication session;

in response to a provisioning of a network service on behalf of a subscriber identity representing a subscriber to the network service, establishing the communication session that communicates traffic flows for a device associated with the subscriber identity;

determining a session identifier that identifies the traffic flows of the communication session;

associating the session identifier with the subscriber identity;

receiving feedback data that indicates that a quality of service of the communication session is below a defined threshold;

determining that the communication session is provided by the first type of network resulting in a first determination;

identifying a first session upgrade procedure from the first group of session upgrade procedures based on the feedback data and the first determination, wherein the first session upgrade procedure comprises increasing a size of a cache associated with the communication session; and in response to determining that the feedback data is associated with the subscriber identity, performing the first session upgrade procedure, including the increasing of the size of the cache associated with the communication session, that increases the quality of service of the communication session according to a defined quality criterion.

13. The non-transitory machine-readable medium of claim 12, wherein the operations comprise based on the feedback data, performing a second the session upgrade procedure from the first group of session upgrade procedures, wherein the second session upgrade procedure comprises modifying a network path of the traffic flows identified by the session identifier.

14. The non-transitory machine-readable medium of claim 12, wherein the operations comprise, based on the feedback data, performing a third session upgrade procedure from the first group of session upgrade procedures, wherein the third session upgrade procedure comprises modifying a quality of service parameter associated with the traffic flows identified by the session identifier.

15. The non-transitory machine-readable medium of claim 12, wherein the operations comprise, based on the feedback data, performing a fourth session upgrade procedure from the first group of session upgrade procedures, wherein the fourth session upgrade procedure comprises increasing allocation of a network resource that is utilized for the traffic flows identified by the session identifier.

16. The non-transitory machine-readable medium of claim 12, wherein the operations comprise, based on the feedback data, performing a fifth session upgrade procedure from the first group of session upgrade procedures, wherein the fifth session upgrade procedure comprises increasing a priority level of the traffic flows identified by the session identifier.

17. A method, comprising:

determining, by a device including a processor, a first order of a first group of session upgrade procedures based on a first type of network providing a communication session and determining a second order of a second group of session upgrade procedures based on a second type of network providing the communication session;

based on a network service being provisioned for a subscriber identity representing a subscriber to the network service, establishing, by the device, the communication session that communicates traffic flows for a subscriber device;

determining, by the device, a session identifier that uniquely identifies the traffic flows of the communication session;

associating, by the device, the session identifier with the subscriber identity;

receiving, by the device, feedback data that indicates that a quality of service of the communication session is below a defined threshold;

determining, by the device, that the feedback data is associated with the subscriber identity;

determining, by the device, that the communication session is provided by the first type of network resulting in a first determination;

identifying a first session upgrade procedure from the first group of session upgrade procedures based on the feedback data and the first determination, wherein the first session upgrade procedure comprises increasing a size of a cache associated with the communication session; and performing, by the device, the first session upgrade procedure, including the increasing of the size of the cache associated with the communication session, that increases the quality of service of the communication session according to a defined quality criterion.

18. The method of claim 17, further comprising transmitting, by the device, the session identifier to the subscriber device.

19. The method of claim 17, wherein the subscriber identity is a first subscriber identity, and further comprising, authorizing, by the device, reporting of the feedback data by a first device, a first application associated with the subscriber identity, a second device, or a second application associated with a second subscriber identity representing a second subscriber that is a party to the communication session.

20. The method of claim 17, further comprising, determining, by the device, that the feedback data was received from a source that is associated with the subscriber identity.

* * * * *